United States Patent [19]

Petercsak

[11] Patent Number: 5,702,196
[45] Date of Patent: Dec. 30, 1997

[54] TURNBUCKLE-TYPE ADJUSTABLE LINK

[75] Inventor: Douglas W. Petercsak, Fillmore, Calif.

[73] Assignee: Teleflex, Incorporated, Plymouth Meeting, Pa.

[21] Appl. No.: 667,426

[22] Filed: Jun. 21, 1996

[51] Int. Cl.$^6$ .................................................. F16B 7/06
[52] U.S. Cl. .......................... 403/46; 403/43; 403/60; 280/95.1
[58] Field of Search ........................... 403/43, 44, 45, 403/46, 47, 48, 59, 60, 110, 359, 296, 306, 307; 280/95.1

[56] References Cited

U.S. PATENT DOCUMENTS

| | | | |
|---|---|---|---|
| 1,265,104 | 5/1918 | Ogden . | |
| 2,354,474 | 7/1944 | Noble et al. . | |
| 2,403,828 | 7/1946 | Rawlins et al. | 403/43 |
| 2,479,096 | 8/1949 | Bratz . | |
| 2,813,733 | 11/1957 | Herrmann | 403/44 |
| 3,837,753 | 9/1974 | Weiste et al. | 403/44 X |
| 4,146,340 | 3/1979 | Smith, Jr. | 403/27 |
| 4,198,174 | 4/1980 | Borowiec et al. | 403/44 |
| 4,418,935 | 12/1983 | O'Connor | 280/461 |
| 4,778,194 | 10/1988 | Koch et al. | 403/46 X |
| 5,042,588 | 8/1991 | Herchenbach et al. | 403/46 X |
| 5,429,447 | 7/1995 | Wood | 403/46 |
| 5,603,583 | 2/1997 | Jackson | 403/43 X |

FOREIGN PATENT DOCUMENTS

| | | | |
|---|---|---|---|
| 298742 | 6/1917 | Germany | 403/46 |
| 580809 | 6/1933 | Germany | 403/46 |
| 524717 | 8/1940 | United Kingdom | 403/46 |

*Primary Examiner*—Kenneth J. Dorner
*Assistant Examiner*—Bruce A. Lev
*Attorney, Agent, or Firm*—Howard & Howard

[57] ABSTRACT

An adjustable link assembly (10) comprising first and second axially aligned rods (12 and 14) and a turnbuckle (16) having a first end (18) threadedly engaging the first rod (12) and a second end (20) threadedly engaging the second rod (14) for axially adjusting the rods (12 and 14) relative to one another upon rotation of the turnbuckle (16). An adjustment sleeve (22) has first and second ends (24 and 26) and is in sliding and nonrotatable relationship with the turnbuckle (16). The assembly is characterized by the sleeve (22) being in sliding engagement with the first rod (12) adjacent the first end (24) of the sleeve (22) for movement between a locked position in which the sleeve (22) is prevented from rotating relative to the first rod (12) and an adjustment position in which the sleeve (22) is free to rotate relative to the first rod (12) so that the sleeve (22) may be rotated to rotate the turnbuckle (16) and axially adjust the rods (12 and 14) when in the adjustment position and so that the turnbuckle (16) is prevented from rotating relative to the first rod (12) to prevent the axial adjustment when the sleeve (22) is in the locked position. The sleeve (22) presents an annular interior shoulder (34) and the turnbuckle (16) presents an annular flange (36) at the second end thereof. A spring (28) is coiled about the turnbuckle (16) and reacts between an interior shoulder (34) and a flange (36) to bias the sleeve (22) to the locked position.

18 Claims, 2 Drawing Sheets

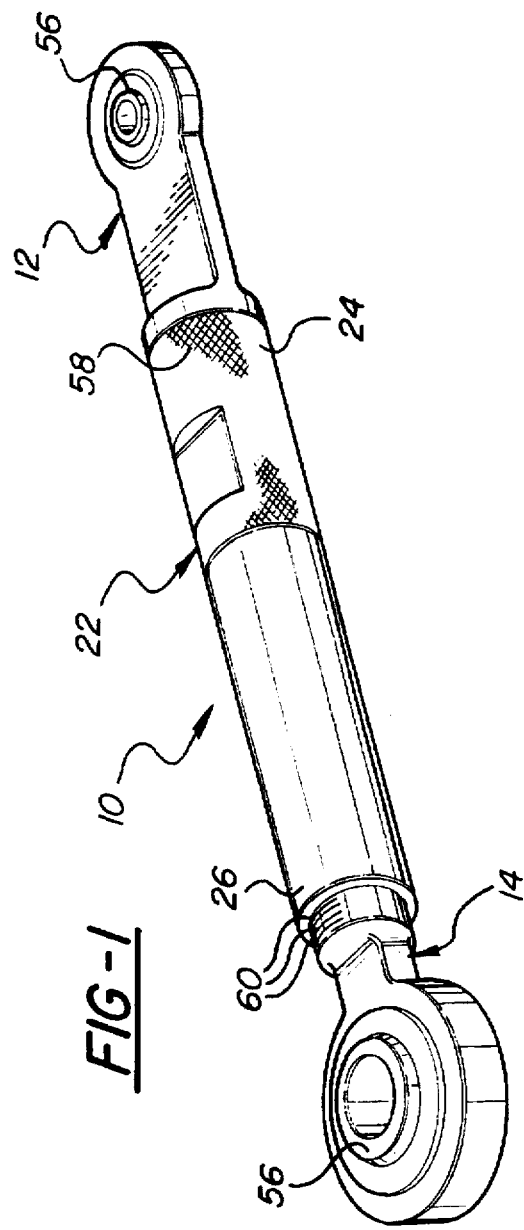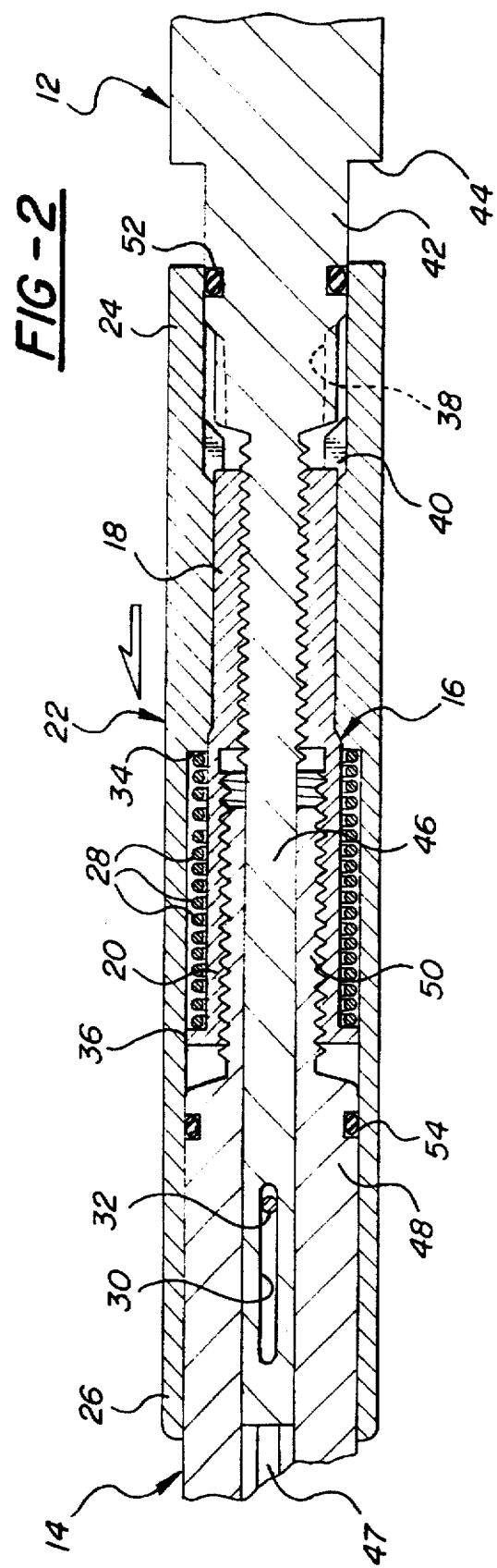

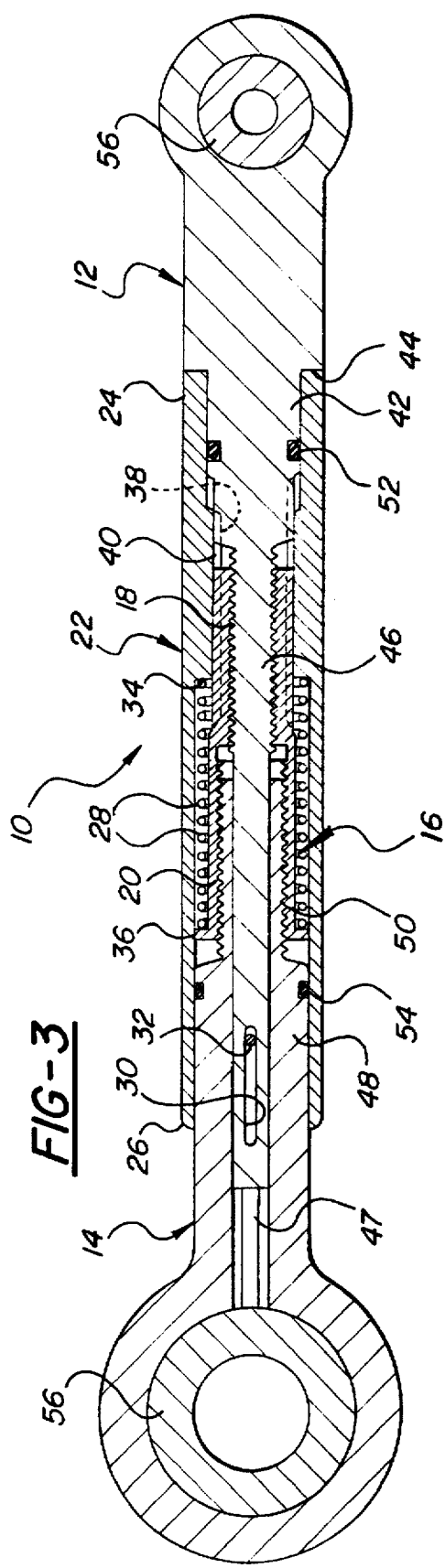
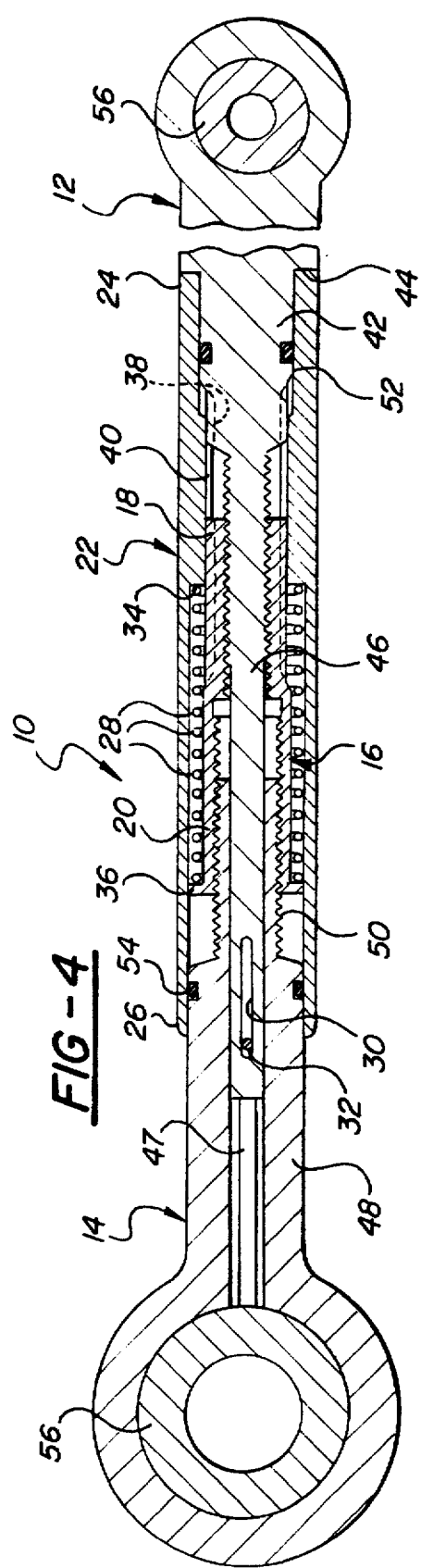

TURNBUCKLE-TYPE ADJUSTABLE LINK

TECHNICAL FIELD

The subject invention relates to adjustable link mechanisms of the type including a turnbuckle to threadedly engage and axially adjust aligned rods.

BACKGROUND OF THE INVENTION

A wide variety of turnbuckle assemblies are known for a wide variety of uses. Many of such assemblies include components for locking the assemblies in an adjusted position. An early example is shown in U.S. Pat. No. 1,265,104 to Ogden wherein a pair of telescoping sleeves surrounding the turnbuckle are pinned to the aligned rods to prevent adjustment. The U.S. Pat. No. 2,354,474 to Noble et al discloses a hexagonal sleeve moved axially to engage hexagonal rods to prevent relative rotation between the rods. The U.S. Pat. No. 2,479,096 to Bratz also uses hexagonal sleeves but, in addition, provides locking tabs to prevent sliding movement of the sleeves relative to the rods.

However, when such assemblies are used in aircraft it is critical that any adjustment mechanism built into the assembly be fail-safe. That is, the assembly must be incapable of self-adjustment due to vibrations, or the like.

SUMMARY OF THE INVENTION AND ADVANTAGES

An adjustable link assembly comprising first and second axially aligned rods and a turnbuckle having a first end threadedly engaging the first rod and a second end threadedly engaging the second rod for axially adjusting the rods relative to one another upon rotation of the turnbuckle. An adjustment sleeve has first and second ends and is in sliding and nonrotatable relationship with the turnbuckle. The assembly is characterized by the sleeve being in sliding engagement with the first rod adjacent the first end of the sleeve for movement between a locked position in which the sleeve is prevented from rotating relative to the first rod and an adjustment position in which the sleeve is free to rotate relative to the first rod so that said sleeve may be rotated to rotate the turnbuckle and axially adjust the rods when in the adjustment position and so that the turnbuckle is prevented from rotating relative to the first rod to prevent the axial adjustment when the sleeve is in the locked position.

Accordingly, such an assembly provides very precise adjustment of its overall length while providing a fail-safe locked position from which it must be manually moved in order to adjust the length of the assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is perspective view of the invention;

FIG. 2 is a longitudinal fragmentary cross sectional view of the invention showing the adjustisting position;

FIG. 3 is a longitudinal cross sectional view showing the assembly in a shortened adjusted position; and FIG. 4 is a cross sectional view like FIG. 3 but showing the assembly in as lengthened adjusted position.

DETAILED DESCRIPTION OF THE PREFERRED EMBODIMENT

Referring to the Figures, wherein like numerals reference like or corresponding parts throughout the several views, an adjustable link assembly is generally shown at 10.

The assembly 10 comprises first and second axially aligned rods, generally indicated at 12 and 14 respectively and a turnbuckle generally indicated at 16. The turnbuckle 16 has a first end 18 threadedly engaging the first rod 12 and a second end 20 threadedly engaging the second rod 14 for axially adjusting the rods relative to one another upon rotation of the turnbuckle 16. As is customary, the threads on the interior of the first end 18 of the turnbuckle 16 are opposite in direction to the threads on the interior of the second end 20 of the turnbuckle 16. An adjustment sleeve, generally indicated at 22, has first and second ends 24 and 26 respectively and is in sliding and nonrotatable relationship with the turnbuckle 16.

The assembly 10 is characterized by the sleeve 22 being in sliding engagement with the first rod 12 adjacent the first end 24 of the sleeve 22 for movement between a locked position in which the sleeve 22 is prevented from rotating relative to the first rod 12 and an adjustment position in which the sleeve 22 is free to rotate relative to the first rod 12 so that the sleeve 22 may be rotated to rotate the turnbuckle 16 and axially adjust the rods 12 and 14 when in the adjustment position and so that the turnbuckle 16 is prevented from rotating relative to the first rod 12 to prevent the axial adjustment when the sleeve 22 is in the locked position. A spring 28 biases the sleeve 22 to the locked position.

The assembly 10 includes a connection for preventing relative rotation between the first 12 and second 14 rods. More specifically, the rods 12 and 14 are in telescoping relationship with one another and the connection between the rods includes, at least in part, an elongated slot 30 in the first rod 12 and a pin 32 extending through the slot 30 and supported by the second rod 14.

The sleeve 22 presents an annular interior 34 and the turnbuckle 16 presents an annular flange 36 at the second end 20 thereof. The spring 28 is coiled about the turnbuckle 16 and reacts between the 34 and the flange 36.

The first rod 12 includes a stationary spline 38 and the sleeve 22 includes an internally splined length 40 extending axially outwardly from the 34 and in engagement with the stationary spline 40 in the locked position and out of engagement with the stationary spline 40 in the adjustment position. The turnbuckle 16 is externally splined on end 18 which is in sliding engagement with the splined length 40 of the sleeve 22 in both of the locked and adjustment positions to maintain the sliding and nonrotatable relationship between the sleeve 22 and the turnbuckle 16.

The first rod 12 includes an annular guide length 42 having a reduced diameter to define an abutment 44 for engaging the first end 24 of the sleeve 22 in response to the biasing action of the spring 28 when in the locked position. The stationary spline 38 is adjacent to and of smaller diameter than the guide length 42 and the internally splined length 40 of the sleeve 22 is spaced from the extremity of the first end 24 of the sleeve 22 to provide a clearance length annularly spaced about the stationary spline 38 in the adjusting position.

The first rod 12 includes a hexagonal shaft 46 extending from the stationary spline 38 and into telescoping relationship with a female hexagonal cavity 47 in the inner end of the second rod 14, these complementary hexagonal sliding relationship also forms part of the connection between the rods 12 and 14. The turnbuckle 16 is in threaded engagement with the shaft 46 internally of the externally splined end 18. The second rod 14 has a large diameter length 48 in sliding engagement with the second end 26 of the sleeve 22 and a small diameter length 50 in threaded engagement with internal threads in the larger one half of the turnbuckle 16. The turnbuckle 16 includes a small threaded bore in threaded engagement with the threaded shaft 46 of the first rod 12 and a large threaded bore in threaded engagement with the small diameter length 50 of the second rod 14.

A first seal 52 is disposed between the guide length 42 and the sleeve 22 for effecting a seal between the sleeve 22 and the guide length 42. The seal 52 is an O-ring disposed in a groove in the guide length 42 and in sliding engagement with the interior of the first end 24 of the sleeve 22. A second seal 54 is disposed between the large diameter length 48 and the sleeve 22 for effecting a seal between the sleeve 22 and the large diameter length 48. The seal 54 is an O-ring disposed in a groove in the large diameter length 48 and in sliding engagement with the interior of the second end 26 of the sleeve 22.

A spherical bearing 56 is supported at the distal end of each of the rods 12 and 14. Also, at least a portion 58 of the exterior length of the sleeve 22 is knurled. Indicia 60 are disposed on the large diameter length 48 of the second rod 14 for indicating the adjusted length of the assembly 10. In other words, after the sleeve 22 is shifted axially to disengage the splined length 40 from the stationary spline 38, the sleeve 22 is rotated to rotate the turnbuckle 16, which moves the rods 12 and 14 axially relative to one another thereby resulting in the extremity of the second end 26 of the sleeve 22 moving axially along the large diameter length 48 of the second rod 14. The indicia 60 are parallel lines on the large diameter length 48 to align with the extremity of the second end 26 to indicate the total length of the assembly 10, i.e., between the centers of the spherical bearings 56. The lines of the indicia may include numbers to indicate the length.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An adjustable link assembly (10) comprising:
first and second axially aligned rods (12 and 14);
a turnbuckle (16) having a first end (18) threadedly engaging said first rod (12) and a second end (20) threadedly engaging second rod (14) for axially adjusting said rods (12 and 14) relative to one another upon rotation of said turnbuckle (16);
an adjustment sleeve (22) having first and second ends (24 and 26) and in sliding and non-rotatable relationship with said turnbuckle (16);
said assembly characterized by said sleeve (22) being in sliding engagement with said first rod (12); said first end (24) of said sleeve (22) and said first rod (12) including a mechanical lock for movement between a locked position in which said sleeve (22) is prevented from rotating relative to said first rod (12) and an unlocked adjustment position in which said sleeve (22) is free to rotate relative to said first and second rods (12 and 14) while remaining in said non-rotatable relationship, and in contact, with said turnbuckle (16) to rotate said turnbuckle (16) relative to said first and second rods (12 and 14) and axially adjust said rods (12 and 14) when in said adjustment position and so that said turnbuckle (16) is prevented from rotating relative to said first rod (12) to prevent said axial adjustment when said sleeve (22) is in said locked position.

2. An assembly as set forth in claim 1 including a spring (28) for biasing said sleeve (22) to said locked position.

3. An assembly as set forth in claim 2 including a connection (30, 32) for preventing relative rotation between said first and second rods (12 and 14).

4. An assembly as set forth in claim 3 wherein said rods (12 and 14) are in telescoping relationship with one another.

5. An assembly as set forth in claim 4 wherein said sleeve (22) presents an annular interior shoulder (34) and said turnbuckle (16) presents an annular flange (36) at said second end thereof, said spring (28) being coiled about said turnbuckle (16) and reacting between said interior shoulder (34) and said flange (36).

6. An assembly as set forth in claim 5 said first rod (12) includes a stationary spline (38) and said sleeve (22) includes an internally splined length (40) extending axially from said interior shoulder (34) and in engagement with said stationary spline (38) in said locked position and out of engagement with said stationary spline (38) in said adjustment position.

7. An assembly as set forth in claim 5 wherein at least a portion of said sleeve (22) is knurled (58).

8. An assembly as set forth in claim 5 including indicia (60) on said large diameter length (48) of said second rod (14) for indicating the adjusted length of said assembly (10).

9. An assembly as set forth in claim 6 wherein said turnbuckle (16) includes an externally splined end (18) in sliding engagement with said splined length (40) of said sleeve (22) in both of said locked and adjustment positions to maintain said sliding and nonrotatable relationship between said sleeve (22) and said turnbuckle (16).

10. An assembly as set forth in claim 9 wherein said first rod (12) includes an annular guide length (42) having a reduced diameter to define an abutment shoulder (44) for engaging said first end (24) of said sleeve (22) in response to said spring (28) when in said locked position.

11. An assembly as set forth in claim 10 including a first seal (52) between said guide length (42) and said sleeve (22) for effecting a seal between said sleeve (22) and said guide length (42).

12. An assembly as set forth in claim 10 wherein said stationary spline (38) is adjacent to and of smaller diameter than said guide length (42), said internally splined length (40) of said sleeve (22) being spaced from said first end (24) of said sleeve (22) to provide a clearance length spaced annularly about said stationary spline (38) in said adjusting position.

13. An assembly as set forth in claim 12 wherein said first rod (12) includes a shaft (46) extending from said stationary spline (38) and into telescoping relationship with said second rod (14), said turnbuckle (16) being in threaded engagement with said shaft (46) internally of said externally splined end (18).

14. An assembly as set forth in claim 13 wherein said second rod (14) has a large diameter length (48) in sliding engagement with said second end of said sleeve (22) and a small diameter length (50) in threaded engagement with said turnbuckle (16).

15. An assembly as set forth in claim 14 including a second seal (54) between said large diameter length (48) and said sleeve (22) for effecting a seal between said sleeve (22) and said large diameter length (48).

16. An assembly as set forth in claim 14 wherein said turnbuckle (16) includes a small threaded bore in threaded engagement with said threaded shaft (46) of said first rod (12) and a large threaded bore in threaded engagement with said small diameter length (50) of said second rod (14).

17. An assembly as set forth in claim 16 wherein said connection between said rods (12 and 14) comprises an elongated slot (30) in said shaft (46) of said first rod (12) and a pin (32) extending through said slot (30) and supported by said second rod (14).

18. An assembly as set forth in claim 17 including a spherical bearing (56) supported at the distal end of each of said rods (12 and 14).

* * * * *